Aug. 6, 1929.   E. W. KELLOGG   1,723,864
MEANS FOR DAMPING MOTION
Filed March 25, 1927
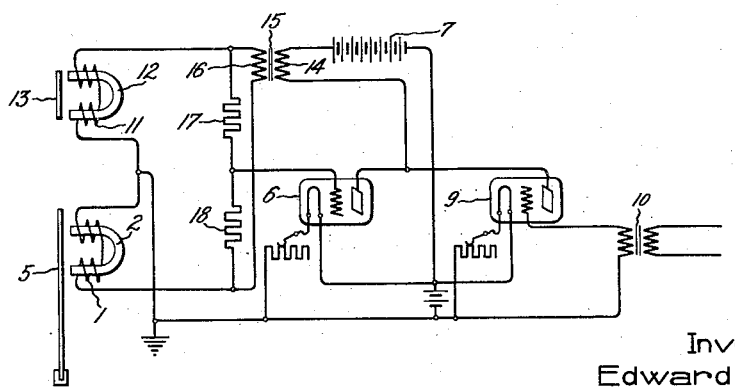
Inventor:
Edward W. Kellogg
by
His Attorney.

Patented Aug. 6, 1929.

1,723,864

UNITED STATES PATENT OFFICE.

EDWARD W. KELLOGG, OF SCHENECTADY, NEW YORK, ASSIGNOR TO GENERAL ELECTRIC COMPANY, A CORPORATION OF NEW YORK.

MEANS FOR DAMPING MOTION.

Application filed March 25, 1927. Serial No. 178,477.

My invention relates to means for damping the motion of vibrating bodies, such as the vibrating parts of an acoustic apparatus or the cutting tool of an apparatus for making phonograph records, and has for its principal object the provision of an improved apparatus and method of operation whereby a vibrating body may be subjected to a damping force which is readily adjusted in magnitude, and which, for a given adjustment, is at each instant in such a direction as to oppose the motion of the body and is proportional to the velocity of this motion.

It has been customary heretofore to dampen the motion of vibrating bodies by means of devices comprising resilient stops, dash pots, or the like. Many of these devices are not altogether satisfactory because they involve the use of moving parts or elastic members and, therefore, in addition to damping, introduce inertia and elasticity effects, and they do not produce a damping force which is readily adjusted in magnitude. In accordance with my invention, these difficulties are minimized or altogether avoided by the provision of an apparatus wherein the current of a damping element is controlled by means of a space discharge device arranged to have its conductivity varied in proportion to the motion to be damped.

My invention will be better understood from the following description when considered in connection with the accompanying drawings and its scope will be pointed out in the appended claims.

Referring to the drawings, the figure illustrates a damping apparatus wherein my invention has been embodied.

This apparatus includes a pair of pick-up coils 1 wound on a core 2 and a pair of coils 11 wound on a core 12. The coils 1 are so arranged that they act on the vibrating member 5 which is made of magnetic material or carries a small armature arranged to cooperate with the coils. The cores 2 and 12 are preferably of a type which carry some permanent magnetic flux. The coils 1 are connected in the input circuit of a space discharge device 6. The output circuit of the space discharge device 6 includes a source 7 and a winding 14 of the transformer 15. Connected in parallel with this output circuit is a space discharge device 9 to which audio frequency grid control potential may be applied through the transformer 10. The secondary winding 16 of the transformer 15 is connected to opposed terminals of a bridge which includes the coils 1, the coils 11, a resistor 17 and a resistor 18, the coils 1 being one arm of the bridge, the coils 2 being another arm of the bridge and the resistors 17 and 18 being the other two arms of the bridge. The input circuit of the space discharge device 6 is connected between a terminal intermediate the coils 1 and 11 and a terminal intermediate the resistors 17 and 18, while the secondary winding 16 is connected between a terminal intermediate the resistor 17 and the coils 11 and a terminal intermediate the coils 1 and a resistor 18. A stationary armature 13 is arranged to cooperate with the coils 11 and the core 12.

The coils 11 and a core 12 are identical with the coils 1 and core 2 except that no motion between the coils 11 and their armature 13 is permitted. It should be noted that the output circuits of the devices 6 and 9 are connected to the primary circuit 14 of a transformer 15 and that the secondary 16 of this transformer is connected to one pair of terminals of the bridge comprising coils 1 and 11 and resistors 17 and 18 while the other terminals of this bridge are connected to the input terminals of the device 6.

With these connections, the secondary voltage of the transformer 15 is balanced with respect to the input circuit of the device 6 but any voltage induced in the coils 1 by motion of the member 5 is supplied to the input circuit of the device 6 and a current tending to retard the motion of this member is transmitted through the coils 1. It will be apparent that the transformer 15 must supply to the bridge comprising the coils 1 a secondary current which is practically in phase with and proportional to the alternating component of the output circuit of the device 6 throughout the essential frequency range. The frequency at which the member 5 vibrates is of course dependent on the electrical impulses applied to the primary circuit of the transformer 10.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a movable body, and a damping apparatus comprising a space discharge device provided with input and output terminals, a coil connected to said input terminals for applying thereto a potential dependent on movement of said body, and means connected to said output terminals for supplying to said coil currents whereby motion of said body may be produced and whereby, in addition, a damping force controlled by said potential may be applied to said member.

2. The combination of a movable body, and a damping apparatus comprising a space discharge device provided with input and output terminals, a coil connected to said input terminals for applying thereto a potential dependent on movement of said body, and means arranged in shunt with said input circuit to form a bridge in which the output of said space discharge device is balanced with respect to the input circuit.

3. The combination of a movable body, and a damping apparatus comprising a space discharge device provided with input and output terminals, a coil connected to said input terminals for applying thereto a potential dependent on movement of said body, and means for applying to said coil a force whereby the motion of said movable body is resisted by the magnetic force of said coil.

4. The combination of a movable body, and a damping apparatus comprising a space discharge device provided with input and output terminals, a coil connected to said input terminals for applying thereto a potential dependent on the movement of said body, a second space discharge device, and means connected with said coil to form a bridge in which the output voltage of said space discharge devices is balanced with respect to the input circuit of said first-mentioned device.

5. The combination of a movable body, and a damping apparatus comprising a space discharge device provided with input and output terminals, a coil connected to said input terminals for applying thereto a potential dependent on the movement of said body, a second space discharge device, and means including a transformer provided with a primary circuit connected to the output circuits of said devices and with a secondary circuit connected with said coil to complete a bridge wherein the output voltage of said devices is balanced with respect to the input circuit of said first mentioned device.

In witness whereof, I have hereunto set my hand this 24th day of March, 1927.

EDWARD W. KELLOGG.